United States Patent [19]

Lemaire et al.

[11] Patent Number: 4,830,463
[45] Date of Patent: May 16, 1989

[54] ARTICLE COMPRISING SILICA-BASED GLASS CONTAINING ALUMINUM AND PHORPHORUS

[75] Inventors: Paul J. Lemaire, Madison; John B. MacChesney, Lebanon; Jay R. Simpson, Fanwood, all of N.J.

[73] Assignee: American Telephone and Telegraph Company, AT&T Bell Laboratories, Murray Hill, N.J.

[21] Appl. No.: 153,746

[22] Filed: Feb. 8, 1988

[51] Int. Cl.$^4$ .............................................. G02B 6/00
[52] U.S. Cl. ............................ 350/96.34; 350/96.30; 65/3.12
[58] Field of Search ................ 350/96.29, 96.30, 96.33, 350/96.34; 65/3.11, 60.8, 3.12, 3.2, 60.1, 63, 65

[56] References Cited

U.S. PATENT DOCUMENTS

| | | | |
|---|---|---|---|
| 4,110,002 | 8/1978 | Klein et al. | 350/96.29 |
| 4,134,851 | 1/1979 | Klein et al. | 252/301.4 P |
| 4,264,350 | 4/1981 | Thomas | 65/26 |
| 4,362,819 | 12/1982 | Olszewski et al. | 501/44 |
| 4,478,489 | 10/1984 | Blankenship et al. | 350/96.30 |
| 4,515,436 | 5/1985 | Howard et al. | 350/96.33 |
| 4,529,426 | 7/1985 | Pleibel et al. | 65/3.11 |
| 4,616,901 | 10/1986 | MacChesney et al. | 350/96.34 |

OTHER PUBLICATIONS

*Journal of Lightwave Technology*, vol. LT-2, No. 2, Apr. 1984, "Polarization Properties of Birefringent Fibers with Stress Rods in the Cladding", by M. J. Marrone et al, pp. 155–160.

*Electronics Letters*, vol. 21, 1985, "Low-Loss and Low-Crosstalk Polarisation-Maintaining Optical Fibres" by T. Hosaka et al, pp. 920–921.

Primary Examiner—William L. Sikes
Assistant Examiner—Frank González
Attorney, Agent, or Firm—Eugen E. Pacher

[57] ABSTRACT

It has been discovered that fused silica doped with approximately equimolar amounts of Al and P, has advantageous properties that make such co-doped glass useful in a variety of applications, including optical fiber, especially polarization-maintaining optical fiber, and planar waveguides in optical and optoelectronic devices. In particular, such co-doped fused silica can have a refractive index that is lower than, or at least not significantly greater than, that of pure fused silica, even though both Al and P individually are known up-dopants for silica. The co-doped fused silica also can have a relatively low working temperature, while otherwise maintaining many of the desirable properties of fused silica, e.g., chemical inertness and relatively low coefficient of thermal expansion.

7 Claims, 2 Drawing Sheets

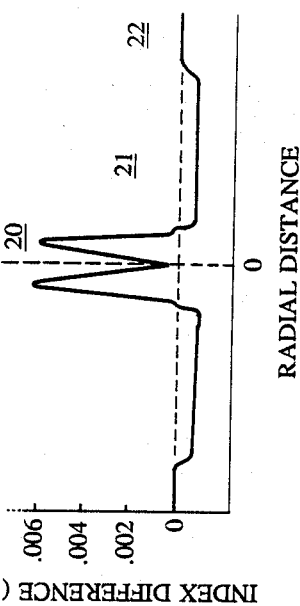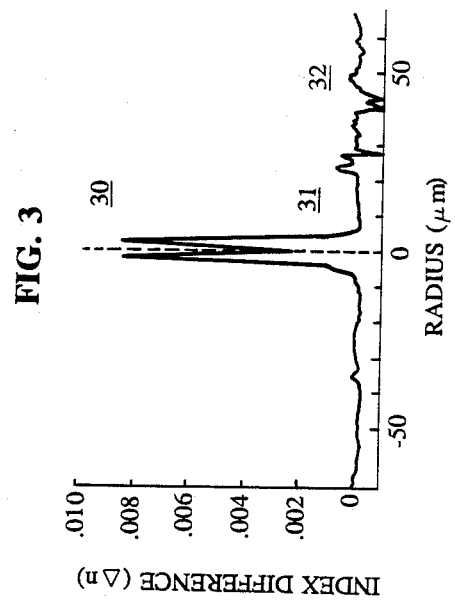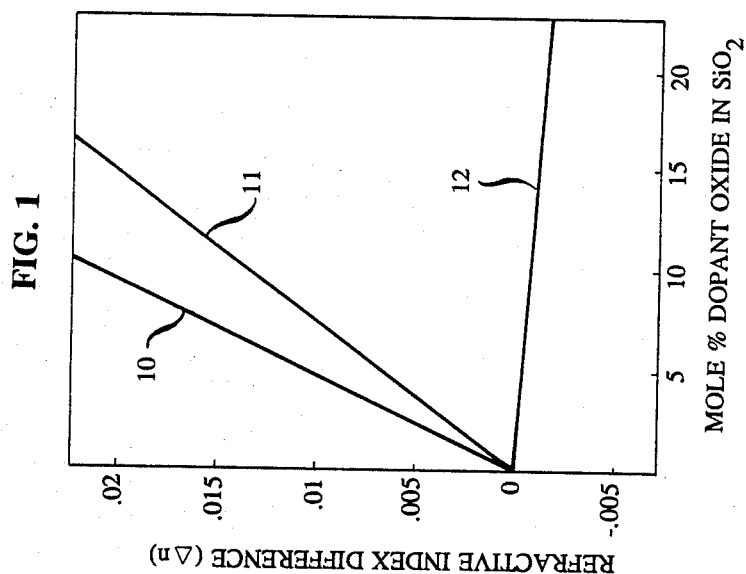

ARTICLE COMPRISING SILICA-BASED GLASS CONTAINING ALUMINUM AND PHORPHORUS

FIELD OF THE INVENTION

This invention pertains to articles that comprise silica-based glass, for instance, silica-based polarization-maintaining optical fiber.

BACKGROUND OF THE INVENTION

Vitreous silica has a number of properties that make it a desirable material for many applications. Among these properties are relatively high chemical inertness, low refractive index, and low coefficient of thermal expansion. However, vitreous silica is a refractory material having a working temperature above about 2000° C., which contributes to the difficulty and expense of manufacturing bodies that comprise vitreous silica. It thus would be desirable to have available a glass composition that substantially retains at least most of the desirable attributes of vitreous silica but has a significantly lower working temperature. This application discloses such a glass composition, as well as articles that comprise the glass. Exemplary of these articles is optical fiber.

Silica-based optical fibers have found wide use in telecommunications, and are being considered for such other applications as sensors and optical gyroscopes. As is well known, optical fibers comprise an axially disposed central region (usually referred to as the "core") which has relatively high refractive index and is contactingly surrounded by a region (usually referred to as the "cladding") that has relatively low refractive index. In such a structure, electromagnetic radiation of the appropriate wavelength is guided by means of total internal reflection, with at least a substantial fraction of the total energy being confined to the core, but, at least in the case of single mode optical fiber, a substantial part of the total energy also extending into the cladding region.

Many chemical elements are known to increase the refractive index of fused silica when incorporated therein. These elements, usually referred to as "up-dopants", comprise Ge, Al, P, Ti, Ta, and La. The number of elements which, when incorporated into fused silica, leave the refractive index substantially unchanged or result in a lowering thereof is much smaller. In particular, only F and B are known to be effective down-dopants useful in silica-based optical fibers. Of the above down-dopants, F is finding widespread use, whereas B is used on a much more restricted basis, at least in part due to the fact that the presence of B in or near the core of the optical fiber results in added attenuation at wavelengths above about 1.1 $\mu$m. U.S. Pat. No. 4,616,901 (incorporated herein by reference) discloses that the simultaneous presence of P and Al in the core of a silica-based optical fiber permits relatively high Al doping (above about 5%) of the core without devitrification.

As is well known, even so-called single mode optical fiber (i.e., optical fiber which guides only the fundamental mode $HE_{11}$) in actuality guides both orthogonal states of the fundamental mode unless special precautions are taken to eliminate mixing between orthogonal states. This is the case in so-called polarization maintaining (PM) fiber. In PM fiber, which typically does not possess the usual circular cross-section symmetry, conditions are arranged such that only one of the two states is guided with relatively low loss. See, for instance, U.S. Pat. Nos. 4,515,436 and 4,529,426, both incorporated herein by reference. PM fibers currently are used primarily for experimental purposes, but are likely to find much wider use in the future, for instance, in sensors and optical gyroscopes and possibly in coherent optical fiber communication systems.

In PM fiber typically one or more stress-producing regions are provided, such that a non-circularly symmetric stress is exerted on the core region, which in turn results in a non-circularly symmetric refractive index in the core. In order to be effective in producing this birefringence, the stress region(s) desirably is(are) close to the core of the fiber. Since fiber material that is close to the core and has a relatively high refractive index may adversely affect the guiding properties of the fiber, it is typically advantageous that the stress-producing region has a refractive index that is equal to or less than that of the cladding. Furthermore, the glass in the stress-producing region typically has to have a coefficient of thermal expansion that substantially differs from that of silica, in order to be effective as a stress producer. The only dopant known to the prior art that both lowers the refractive index of silica and sufficiently increases the coefficient of thermal expansion thereof is boron. Thus, the stress-producing region in prior art PM fiber typically consists substantially of B-doped silica. However, as mentioned above, B-doped silica attenuates radiation of wavelength above about 1.1 $\mu$m, requiring a compromise between the conflicting requirements of placement of the stress region close to the core to be effective in stressing the core, and placement of the B-doped region away from the core to avoid excess attenuation, at least for fibers designed to operate at wavelength above about 1.1 $\mu$m. As is well known, the currently preferred wavelengths for telecommunications purposes are about 1.3 $\mu$m, with about 1.55 $\mu$m being likely to become the preferred operating wavelength in the future.

In view of the potential importance of silica-based PM optical fiber, it would be highly desirable to have available means for forming a stress-producing region that has a refractive index that is not substantially larger than that of silica, and that does not result in substantial added absorption of radiation in the wavelength range of current interest for optical communications and other relevant applications, typically from about 0.5 $\mu$m to about 1.7 $\mu$m. This application discloses such means, and optical fiber comprising such means.

SUMMARY OF THE INVENTION

We have discovered that co-pending fused silica with Al and P, in approximately equimolar amounts, can leave the refractive index of the silica substantially unchanged or even result in a lowering of the refractive index, even though Al and P individually are well-known up-dopants of silica. Furthermore, such doping can substantially reduce the working temperature of the glass, as compared to undoped fused silica. Silica doped with as much as 30 mol % $AlPO_4$ does not require quenching to avoid crystallization, and even such a relatively large amount of dopant does not result in unacceptably large change in many of the desirable properties of fused silica. For instance, although the doped silica according to the invention has a higher coefficient of thermal expansion than pure fused silica, the coefficient is still small compared to that of many ordinary glasses. Silica doped with approximately equimolar amounts of Al and P will herein be referred to as (Al, P)-doped silica.

In order for the working temperature of Al- and P-doped fused silica to be lowered sufficiently to be of practical significance, the material desirably contains at least about 2 atomic % of each of Al and P. Furthermore, glass according to the invention has a refractive index n that exceeds $n_o$, the refractive index of fused silica, at most by about 0.001, and has a $T_g$ that is substantially (typically at least 100° C.) lower than the $T_g$ of pure fused silica ($\sim$1170° C.). As is well known, $T_g$ is conventionally defined as the temperature at which the glass has a viscosity of $10^{13.4}$ poise.

Glass according to the invention can be incorporated into a variety of articles, including into optical fiber, where it can be advantageously used due to, inter alia, the unexpectedly low refractive index of the glass. This makes it, for instance, possible to use approximately equimolar amounts of Al and P as down-dopant in the cladding region of optical fiber.

In a currently preferred optical fiber according to the invention the co-doped cladding region is a stress-producing region in a PM fiber. In this fiber, the stress-producing region can be placed relatively close to the core since the stress-producing region does not substantially absorb electromagnetic radiation of wavelengths of interest herein.

In an exemplary embodiment of the invention, the core of the silica-based PM fiber is Ge-doped silica, the stress-producing cladding region contactingly surrounds the core and is doped with approximately equimolar amounts of Al and P, to a level in the range from about 5 to about 30 mol % of dopant oxide in the $SiO_2$. The stress-producing cladding region in turn is contactingly surrounded by a further cladding region whose refractive index is substantially the same as that of the stress-producing region but which is not doped with Al and P. Exemplarily, this outer cladding region is either pure $SiO_2$ or F-doped $SiO_2$. This outer cladding region in turn may be surrounded by further cladding material, e.g., relatively impure $SiO_2$ derived from a silica substrate or overcladding tube, that essentially does not play any part in the guidance of the radiation but serves to provide bulk and mechanical strength to the fiber. Such a fiber can be produced by any appropriate process, e.g., a process that comprises depositing (e.g., by MCVD), in sequence, the outer cladding material, the co-doped cladding material, and the core material onto the inside surface of a silica tube, and collapsing the thus formed structure into a cylindrical preform. The thus produced preform can then be deformed in the manner described in U.S. Pat. No. 4,529,426, and optical fiber drawn from the deformed preform in shape-preserving manner.

In PM fiber according to the invention the (Al, P)-doped silica region typically has a refractive index that is not substantially higher (typically by at most about 0.001), and preferably is equal to or less, than that of pure fused silica, and has a coefficient of thermal expansion larger (typically by at least about 50%) than that of pure fused silica.

Fibers according to the invention are not necessarily PM fibers but may also be fibers in which mixing between orthogonal modes of polarization substantially does not occur. In the latter case co-doping is used to produce a cladding region of refractive index equal to or less than that of silica, and/or to decrease the collapse temperature of the preform. Furthermore, the co-doped cladding region need not necessarily surround the core but can be isolated portions of the cladding, e.g., the material derived from the stress rods in PANDA PM fiber.

Use of glass according to the invention is not limited to optical fiber. Instead, such glass can be used in essentially all applications that demand a pure relatively chemically inert glass that has relatively low refractive index and thermal expansion. Exemplary of such applications are semiconductor processing, electronic packaging, and vapor lights. Glass according to the invention may also be used advantageously in planar waveguides for, e.g., passive optical devices or integrated electronic/photonic devices. In these latter applications, the relatively low processing temperature of the inventive glass is considered to be important. As was indicated above, glass according to the invention has a relatively low working temperature. Therefore, it may frequently be easier and cheaper to make and to process into commercially useful articles than is fused silica.

BRIEF DESCRIPTION OF THE DRAWINGS

FIG. 1 depicts the refractive indices of Al-doped and P-doped silica, and preliminary data on the refractive index of (Al, P)-doped silica, all as a function of dopant concentration;

FIGS. 2 and 3 show the index profile of the relevant portion of an exemplary inventive preform, and of a fiber drawn from the preform, respectively.

DETAILED DESCRIPTION OF SOME CURRENTLY PREFERRED EMBODIMENTS

Figure 4:
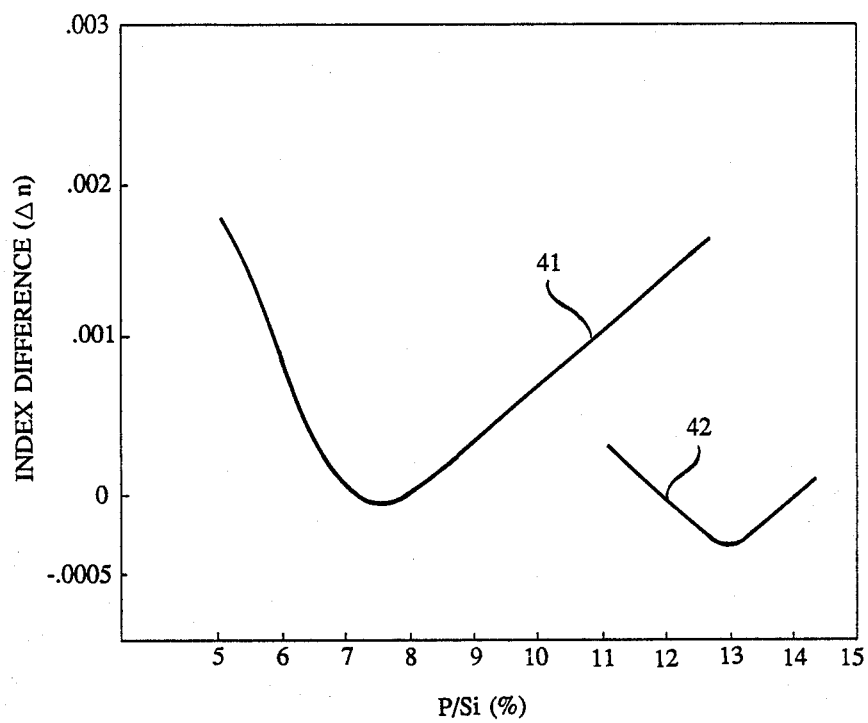
FIG. 4 gives preliminary data on the refractive index as a function of the Al/P ratio.

A significant aspect of the invention is the unexpected discovery that the refractive index of fused silica, co-doped with Al and P, can be equal to or less than that of pure fused silica (it will be understood that the refractive indices of two materials are to be compared at the same wavelength, e.g., the design or operating wavelength of an optical fiber).

A further aspect of the invention is the discovery that the coefficient of thermal expansion of (Al, P)-dopant silica, although small compared to that of many other glasses, can differ sufficiently from that of pure silica such that (Al, P)-doped silica can be advantageously used as the stress-producing material in silica-based PM fiber. Although (Al, P)-doped cladding material may be used in other than PM fiber (e.g., in single mode optical fiber of the matched cladding or depressed cladding design), the discussion below will be primarily in terms of PM fiber.

In general, it can be said that (Al, P)-doped silica can replace prior art stress-producing material (e.g., B or Al-doped silica) wherever such material is used in PM fiber. For instance, (Al, P)-doped silica rods can be inserted into the cladding region of PANDA preforms instead of the previously used B-doped silica rods (e.g., T. Hosaka et al, *Electronics Letters*, Vol. 21, pp. 920–921, 1985), or can replace the aluminosilicate stress rods of another prior art fiber (see M. J. Marrone et al, *Journal of Lightwave Technology*, Vol. LT-2, page 155).

FIG. 1 shows the known change in refractive index ($\Delta n = n - n_o$, where $n_o$ is the refractive index of fused silica) that results from doping fused $SiO_2$ with Al (curve 10), as well as with P (curve 11), both as a function of concentration of the dopant oxide. Both of the curves rise steeply with increasing dopant concentration. FIG. 1 also contains curve 12 which represents preliminary measurements of $\Delta n$ produced by doping $SiO_2$ with essentially equimolar amounts of Al and P, also as a function of dopant oxide concentration. Although further research may result in some modification of curve 12, it is apparent that doping $SiO_2$ with Al and P can have the surprising result of lowering the refractive index.

An exemplary technique for forming PM fibers according to the invention comprises making a circularly symmetric preform by MCVD, deforming (flattening) the preform substantially as taught in U.S. Pat. No. 4,529,426, and drawing optical fiber from the flattened preform in a cross section-maintaining manner. The fibers typically are coated in known fashion with a known polymer.

In a typical embodiment of the above MCVD-based process, gaseous Al-containing and P-containing precursor gases such as $Al_2Cl_6$ and $POCl_3$ are delivered, together with gaseous $SiCl_4$, to a reaction zone and reacted there with $O_2$ at about 1800° C. such that the reaction product is deposited on a substrate such as the inside surface of a fused quartz substrate tube. Gaseous $Al_2Cl_6$ can be produced by passing $Cl_2$ gas over heated aluminum wires, as disclosed in U.S. Pat. No. 4,616,901.

After deposition of a sufficient thickness of (Al, P)-doped silica the delivery of the Al- and P-containing precursor gases is stopped and a suitable precursor of an index-raising dopant (typically $GeCl_4$) is introduced into the gas stream, whereby the up-doped silica that eventually will become the core of the fiber is formed and deposited on the (Al, P)-doped glass. The resulting glass tube with deposited material thereon is then collapsed in a known fashion such that a preform of circular cross section results.

In fiber according to the invention the respective concentrations of Al and P are chosen such that in the co-doped region $\Delta n$ of the resulting glass is at most about 0.001. Typically this implies that Al and P are present in approximately equimolar concentration. This requires that the relevant oxides ($Al_2O_3$, $P_2O_5$ and $SiO_2$) are formed from their respective chlorides at the appropriate rates to yield the correct dopant concentration. Due to the fact that the above oxides do not have equal volatilities (phosphorus oxide is volatilized from the deposit much more readily than either alumina or silica), and that their chloride/oxide equilibria are not necessarily equivalent, it is typically necessary to adjust the delivery of the various precursors to compensate for these effects. For instance, we have found that the flow rate of $POCl_3$ in the gas stream desirably is about 10% greater (on a molar basis, for a deposition temperature of about 1800° C.) than that of $Al_2Cl_6$. Since the referred-to depletion effect is temperature dependent, the flow conditions typically are selected in accordance with the deposition temperature, and generally valid limits cannot be given. However, a minor amount of experimentation typically will suffice to determine the appropriate conditions. Exemplary flow rates (reaction temperature about 1800° C.) are given in Table I.

TABLE I

| Flow Rates for Deposition of (Al, P)-doped Silica | | | | | |
|---|---|---|---|---|---|
| Example No. | Reactant Flow Rates | | | | P-to-Al Molar Ratio in Feed |
| | $SiCl_4$ (g/min) | $POCl_3$ (g/min) | $Al_2Cl_6$ (g/min) | $O_2$ (l/min) | He (l/min) | |
| I | 1.52 | 0.316 | 0.243 | 0.9 | 0.2 | 1.13 |
| II | 1.52 | 0.31 | 0.25 | 0.9 | 0.2 | 1.08 |

The refractive index profile of the relevant portion of an exemplary fiber preform according to the invention is shown in FIG. 2, wherein 20 is the core region, 21 the (Al, P)-doped deposited cladding region, and 22 the tube-derived $SiO_2$ cladding region. As can be seen from FIG. 2, the refractive index of region 21 is less than $n_o$.

FIG. 3 shows the index profile of an optical fiber drawn from the preform of FIG. 2. In analogy to the preform, numeral 30 refers to the fiber core, 31 to the (Al, P)-doped deposited cladding region, and 32 to the tube-derived silica cladding. It will be noted that the refractive index of cladding region 31 is essentially equal to that of undoped $SiO_2$, whereas in the preform the index of the corresponding region 21 is substantially less than that of $SiO_2$. This change in refractive index is frequently observed and is believed to be associated with fiber drawing from the preform. In particular, it is believed to be associated with drawing under relatively high draw tension, such as is typically used if a non-circular preform cross section is to be preserved.

Regardless of the mechanism that is responsible for the observed change in the refractive index of the (Al, P)-doped silica, the deposition conditions (including precursor flow rates) advantageously are set such that the desired index profile is obtained in the fiber. Since the change in the refractive index depends, inter alia, on the draw temperature and/or tension, no generally valid prescription can be provided. However, a minor amount of experimentation typically will suffice to establish the appropriate deposition conditions.

FIG. 4 shows exemplary preliminary results on the dependence of the refractive index on the ratio of Al to P in $SiO_2$, with curve 41 pertaining to glass having an Al concentration such that the atomic ratio Al/Si is 7.2% and 42 to glass in which this ratio is 12%. The abscissa gives the atomic ratio of P/Si in percent. As the preliminary data indicate, the minimum refractive index of (Al, P)-doped silica occurs at, or close to, equimolar dopant concentration.

EXAMPLE 1

On the inside of a standard 16×19 mm fused silica tube a quantity of (Al, P)-doped silica was deposited by MCVD. The flow rates of the precursor gases and of the diluent (He) were as listed in Table I under Example No. I, and the reaction temperature was about 1800° C. The $Al_2Cl_6$ was produced by passing $Cl_2$ gas over heated Al wires, substantially as disclosed in U.S. Pat. No. 4,616,901. After 20 deposition passes the flow of $Al_2Cl_6$ and $POCl_3$ was terminated and instead 1 g/min of $GeCl_4$ introduced into the gas stream. After a single deposition pass, the tube was collapsed in a known manner, resulting in a cylindrical preform rod with the refractive index in the (Al, P)-doped cladding region being essentially equal to $n_o$. Drawing an optical fiber in known fashion from the preform results in a fiber whose refractive index in the (Al, P)-doped cladding region is slightly greater than $n_o$ (by about 0.001) but less than the core refractive index.

EXAMPLE 2

An optical fiber preform was produced substantially as-described in Example 1, except that the flow rates for the deposition of the (Al, P)-doped cladding material were as indicated in Table I under Example No. II, and except that 22 deposition passes were made. The resulting preform has a refractive index profile substantially as shown in FIG. 2. Fiber drawn from the preform in a known manner has an index profile substantially as shown in FIG. 3. The fiber has core, deposited cladding, and overall diameters of about 6, 40, and 125 $\mu$m, respectively, a cut-off wavelength of about 1.15 $\mu$m, and has a loss at 1.55 $\mu$m of about 0.5 dB/km.

EXAMPLE 3

A preform was produced substantially as described in Example 2. The preform was heated and squeezed, substantially as described in U.S. Pat. No. 4,529,426, resulting in a preform of approximately rectangular cross section, of approximate aspect ratio 1:2. A fiber was drawn from the preform (about 40 g draw tension) in a known manner, with the cross section of the fiber having essentially the same shape as that of the preform. The refractive index of the fiber along the major axis thereof was substantially as shown in FIG. 3. The fiber was a PM fiber having an extinction ratio at 1.3 $\mu$m of 42.5 dB for 10 m length, and 22 dB for 500 m, with the corresponding h parameter being $1.3 \times 10^{-5}/m^{-1}$. The beat length at 0.488 $\mu$m is about 9 mm, corresponding to a modal birefringence of $5.3 \times 10^{-5}$. The attenuation at 1.6 $\mu$m was about 0.5 dB/km, and at 1.3 $\mu$m about 1.5 dB/km. The thermal expansion coefficient of the (Al, P)-doped cladding region was about $1.4 \times 10^{-6}(°C)^{-1}$, which is about three times that of pure silica.

What is claimed is:

1. An article comprising silica-based glass that is co-doped with Al and P, with the atomic ratio of Al to Si in the co-doped glass being greater than about 0.02; characterized in that
   the ratio of Al to P is chosen such that the refractive index of the co-doped glass exceeds $n_o$, the refractive index of pure fused silica, by at most about 0.001.

2. The article of claim 1, wherein the article is an optical fiber or an optical fiber preform, with the optical fiber as well as the optical fiber preform comprising a core and a cladding surrounding the core, the cladding comprising the co-doped glass.

3. The article of claim 2, wherein the optical fiber is a polarization-maintaining fiber comprising at least one stress-producing region that comprises the co-doped glass.

4. The polarization-maintaining fiber of claim 3, wherein the refractive index of the co-doped glass is less than or equal to $n_o$.

5. The article of claim 1, wherein the co-doped glass comprises approximately equimolar amounts of Al and P.

6. The article of claim 1, wherein the co-doped glass is produced by a method that comprises introducing an Al-containing precursor gas, a P-containing precursor gas, and a Si-containing precursor gas into a reaction zone, reacting the precursor gases with oxygen and causing deposition of a (Al, P)-doped silica-based reaction product on a substrate.

7. The article of claim 1, wherein the article comprises a planar optical waveguide disposed on a substrate, the waveguide comprising the co-doped glass.

* * * * *